United States Patent Office 3,579,629
Patented May 18, 1971

3,579,629
SALTS OF COPOLYMERS OF VINYL ACETATE/
CROTONIC ACID/VINYLIC OR ALLYLIC OR
METHALLYIC ESTERS IN HAIR COSMETICS
Regine Pasero, nee Perruche, and Andre Viout, Paris,
France, assignors to Societe Anonyme dite: L'Oreal
No Drawing. Filed July 25, 1967, Ser. No. 655,770
Claims priority, application France, Aug. 3, 1966,
71,998
Int. Cl. A61k 7/06
U.S. Cl. 424—47       7 Claims

ABSTRACT OF THE DISCLOSURE

Compositions containing copolymers for use as hair dressing preparations. The copolymers consist of vinyl acetate, crotonic acid and either a vinylic ester, allylic ester or methallylic ester.

---

It is known that at present natural or synthetic resins are utilized, most often in hydrous-alcoholic or alcoholic solutions, in order to form lacquers or lotions for setting waves in hair.

Cosmetic utilization of such resins has the purpose of helping keep hair in the shape intended and to improve its appearance by giving it, particularly, a more brilliant appearance.

It is already known how to utilize for this purpose homopolymers such as polyvinylpyrrolidone, copolymers such as the copolymer of vinylpyrrolidone/vinyl acetate, the copolymers of acrylic esters/unsaturated monoethylenic acids, the copolymers of maleic anhydride/esterified or amidified alkyl-vinylic ether, as well as vinyl acetate/ unsaturated monoethylic acids such as crotonic acid copolymers.

The present invention is concerned with new copolymers which facilitate the formation of cosmetic compositions presenting better qualities than those which have been known heretofore.

The polymers according to the present invention facilitate the preparation of lacquers or setting lotions which make possible the formation of films having a lacquering power notably superior to that obtained with prior known resins.

In addition, these polymers result in a very rapid hardening of the film formed, so that for an identical lacquer power one may utilize, for example, a much smaller quantity of polymers according to the invention than that which is necessary, for example, with a vinyl acetate/crotonic acid polymer of known type.

It follows that cosmetic compositions prepared according to the procedure of the present invention provide excellent results at less cost.

The copolymers according to the invention also confer other particularly interesting advantages to cosmetic compounds.

They provide films having a brilliance notably superior to that obtainable by copolymers presently in use.

Moreover, these novel copolymer compositions have a notable affinity for the hair, which offers the double advantage of conferring a better "hold" to the hair, for example, during the utilization of the new copolymers in hair wave setting lotions, as well as allowing combing of the hair without noticeably destroying the formed polymeric film. It is a known fact that, when resins of previously utilized types are employed, combing results in almost total destruction of these prior resins which fall in the form of a white powder. On the contrary, in the case of cosmetic compositions according to the present invention, combing is made possible, the copolymer films nevertheless being easily removable by brushing or washing with a conventional type shampoo.

Finally, it is remarkable that the cosmetic compounds according to the invention which already present an important number of advantages with respect to known compounds, are characterized by the formation of a film which has a weak hygroscopicity, so that there are obtained coiffures which remain stable even under conditions of prolonged high atmospheric humidity.

The present invention has for an object provision of a new industrial product which comprises a copolymer obtained by copolymerization of vinyl acetate, crotonic acid, and at least one other polymerizable monomer chosen from the following group: the vinylic esters of formula:

in which
R represents a hydrocarbon radical of linear or branched chain structure comprising from 10 to 22 atoms of carbon, the allylic esters and the methallylic esters of formula:

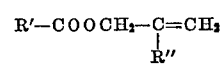

in which
R' represents a hydrocarbon radical with saturated linear or branched chain comprising from 10 to 22 carbon atoms, and
R" represents a hydrogen atom or the —CH$_3$ radical.

Conforming to the invention, the above cited copolymers preferably contain from 63 to 88% of vinyl acetate, from 5 to 15% and preferably from 7 to 12% of crotonic acid and from 5 to 25% of vinylic esters, allylic esters or methallylic esters.

Among the vinylic esters capable of being utilized according to the invention, may be mentioned vinyl laurate, vinyl palmitate, vinyl stearate, vinyl isostearate, vinyl behenate, as well as others.

Among the allylic and methallylic esters which can be utilized conforming to the invention, can be mentioned by way of example allyl laurate, methallyl laurate, allyl stearate, methallyl stearate, allyl isostearate, methyallyl isostearate, allyl behenate.

The present invention also has for an object the provision of polymers as described above which have undergone neutralization of their acid functions by means of mineral or organic bases, with a view to increasing their solubility in order to facilitate their utilization in cosmetic compositions.

It is found moreover that the copolymers according to the present invention can be advantageously neutralized with a mineral or organic base utilized in an equal quantity, for example 10 to 150% and preferably 50 to 100% of the quantity corresponding to a stoichiometric neutralization.

By way of example, conventional cosmetic bases such as monoethanolamine, diethanolamine, triethanolamine, the isopropanolamines, morpholine, may be advantageously utilized to effect neutralization of copolymers, as well as the amino-alcohols already known for their utilization so as to neutralize polymers such as 2-amino-2-methyl-1-propanol; 2-amino-2-methyl-1,3 - propane - diol, etc.

The copolymers according to the invention can be prepared through copolymerization in liquid phase for example in a solvent such as alcohol or benzene. However, it is preferable to carry out polymerization in mass or in suspension.

These polymerizations can be effected in the presence of a polymerization catalyst such as benzoyl peroxide, lauroyl peroxide, azobisisobutyronitrile, the concentration of the catalyst being for example between 1 to 5% and preferably between 1.5 and 3% by weight of monomers entering into the reaction.

Polymerization in suspension which permits obtaining the copolymer in the form of fine particles is effected in water in the presence of a protective colloid such as polyvinylic alcohol, or polyacrylic acid (product known as Carbopol) or hydroxyethylcellulose (sold under the trademark Cellosize).

The concentration of the protective colloid can be, for example, from 0.06 to 1% with respect to the weight of monomers.

The present invention also has for an object the new industrial product which constitutes a cosmetic product characterized by the fact that it contains at least one copolymer such as that defined above, eventually neutralized as indicated, in solution in an appropriate cosmetic vehicle.

The cosmetic product according to the invention can be, for example, a hair lacquer in aerosol form or otherwise, a lotion for wave setting, or a treatment compound for the hair.

The composition according to the invention can be in the form of a solution, jelly, cream, or foam; it can also be prepared in the form of an aerosol.

By way of example, an aerosol lacquer for hair can be prepared by introducing 1 to 4% of a copolymer according to the invention, thereafter neutralized in a mixture constituted by ¼ to ⅓ by weight of alcohol and ⅔ to ¾ by weight of a propellant gas liquefied under pressure.

A setting lotion according to the invention can be, for example, prepared by introducing in a hydrous-alcoholic solution in proportion of 20 to 70% in alcohol, 1 to 3% by weight of a copolymer according to the invention, preferably neutralized.

The cosmetic compounds according to the invention may also comprise conventional cosmetic adjuvants such as plasticizers, perfumes, dyes, cationic substances to facilitate combing, nonionic products to assure peptization, perfumes, urea to facilitate penetration into the fiber, silicones to improve brilliance, or other cosmetic resins.

For the purpose of better understanding the invention there will now be described, by way of illustration and not limitation, several examples of operation.

EXAMPLES OF PREPARATION

Example 1.—Preparation of copolymer in suspension: vinyl acetate 75%, crotonic acid 10%, vinyl stearate 15%

There is placed in a vessel fitted with an agitator, a reflux refrigerant, a thermometer, and a nitrogen conveying tube, 400 grams of an aqueous hydroxyethylcellulose solution known under the trademark "Cellosize" at a 1% concentration.

|  | G. |
|---|---|
| Vinyl acetate | 225 |
| Crotonic acid | 30 |
| Vinyl stearate | 45 |
| Azobisisobutyronitrile | 3.75 |

It is brought to reflux with stirring and under nitrogen. After about 8 hours the polymerization is ended.

It is allowed to cool, dried in air, and heat dried. A copolymer is obtained which is in the form of fine particles with a yield of 85%.

By way of example and to show the weak hygroscopicity of polymers according to the invention, there will be prepared in identical manner three films to be placed for 24 hours in an atmosphere having a relative humidity of 80% and the quantity of water absorbed with respect to the initial weight of the film is measured.

The first film which is constituted by a polyvinyl-pyrrolidone/vinyl acetate copolymer took up 28% of water.

The second film which is constituted by a vinyl acetate crotonic acid copolymer absorbed 15% of water.

Finally, the third copolymer which is that described in the preceding example, took up only 11% of water.

Thus it is seen that the present copolymer presents a weak hygroscopicity with respect to the other known polymers.

Example 2.—Preparation of a copolymer in mass: vinyl acetate 80%, crotonic acid 10%, vinyl stearate 10%

There is placed in a 500 cc. reactor fitted with an agitator, thermometer, reflux refrigerant and nitrogen supply tube, the following mixture of monomers:

|  | G. |
|---|---|
| Vinyl acetate | 160 |
| Crotonic acid | 20 |
| Vinyl stearate | 20 |
| Benzoyl peroxide (85% pure) | 2.35 |

The above mixture is heated at reflux under agitation and under nitrogen.

In the course of polymerization the mixture thickens and when polymerization is terminated, after five or six hours, the polymer appears in the form of a solid mass which is evacuated hot.

Through cooling there is obtained with a quantitative yield, a slightly yellow colored transparent product which can be reduced to a powder.

Example 3.—Preparation of a copolymer in mass: 70% vinyl acetate, 10% crotonic acid, 20% vinyl stearate The procedure is the same as described in Example 2.

In the same way a quantitative yield of a light yellow colored transparent product is obtained which can be easily powdered.

Example 4.—Preparation of a coplymer in mass: 75% vinyl acetate, 10% crotonic acid, 15% allyl stearate The procedure is the same as that of Example 2.

A quantitative yield of an easily powdered transparent product is obtained.

Example 5.—Preparation of a copolymer in mass: 75% vinyl stearate, 10% crotonic acid, 15% vinyl stearate The procedure is the same as that of Example 2.

A quantitative yield of an easily powdered transparent product is obtained.

Example 6.—Preparation of a particulate copolymer: 71.5% vinyl acetate, 8.5% crotonic acid, 20% vinyl laurate The procedure is the same as that described in Example 1.

An 85% yield of the desired copolymer is obtained.

Example 7.—Preparation of a particulate copolymer, 75% vinyl acetate, 10% crotonic acid, 15% allyl laurate The procedure is the same as described in Example 1.

A 75% yield of the desired polymer is obtained.

Example 8.—Preparation of a particulate copolymer: 75% vinyl acetate, 10% crotonic acid, 15% allyl isostearate The procedure is the same as that described in Example 1.

A 63% yield of the desired copolymer is obtained.

Example 9.—Preparation of a particulate copolymer: 75% vinyl acetate, 10% crotonic acid, 15% methallyl stearate The procedure is the same as that described in Example 1.

A 62% yield of the desired copolymer is obtained.

Example 10—Preparation of a particulate copolymer: 75% vinyl acetate, 10% crotonic acid, 15% vinyl isostearate The procedure is the same as that described in Example 1.

A 75% yield of the desired copolymer is obtained.

EXAMPLES OF APPLICATION

Example A

To form an aerosol hair lacquer, a solution having the following composition is prepared:

|   | G. |
|---|---|
| Copolymer described in Example 2 | 8 |
| 2-amino-2-methyl-1-propanol | 0.89 |
| Diethyl adipate | 0.20 |
| Perfume | 0.5 |
| Absoltue ethyl alcohol, q.s.p. | 100 |

25 grams of this solution is conditioned in an aerosol bomb with 45 grams of product known as "Freon 11" and 30 grams of the product known as "Freon 12." Freon 11 and 12 are, respectively, trichlorofluoromethane and dichlorodifluoromethane.

By pulverization a lacquer insuring excellent holding of the hair-do is obtained.

Example B

To form an aerosol lacquer, a solution having the following composition is prepared:

|   | G. |
|---|---|
| Copolymer described in Example 2 | 4 |
| 2-amino-2-methyl-1-propanol | 0.45 |
| Ethyl phthalate | 0.2 |
| Perfume | 0.2 |
| Absolute ethyl alcohol, q.s.p. | 100 |

30 grams of this solution is introduced into an aerosol bomb with 42 grams of the product labelled "Freon 11" and 28 grams of "Freon 12."

After application on the hair, the films are brilliant and not hydroscopic.

Example C

To form an aerosol hair lacquer, a solution having the following composition is prepared:

|   | G. |
|---|---|
| Copolymer described in Example 5 | 6 |
| Polyvinylpyrrolidone/vinyl acetate | 2 |
| 2-amino-2-methyl-1,3-propanediol | 0.63 |
| G 11 (hexachlorophene) | 0.05 |
| Isopropyl laurate | 0.2 |
| Perfume | 0.3 |
| Absolute ethyl alcohol, q.s.p. | 100 |

25 grams of this solution is conditioned in an aerosol bomb with 45 grams of "Freon 11" and 30 grams of "Freon 12."

After pulverization, the hair is brilliant, not dusty, and lacquer is easily removed by brushing.

Example D

To form an aerosol hair lacquer, a solution having the following composition is prepared:

|   | G. |
|---|---|
| Copolymer described in Example 1 | 6 |
| 2-amino-2-methyl-1-propanol | 0.7 |
| Ethylcellosolve | 0.3 |
| Perfume | 0.3 |
| Absolute ethyl alcohol, q.s.p. | 100 |

To 25 grams of this solution is added 45 grams of "Freon 11" and 30 grams of "Freon 12" and the mixture is conditioned in an aerosol bomb.

This compound is particularly suitable for a lacquer. Ethylcellosolve is 2-ethoxyethanol.

Example E

To form an aerosol hair lacquer, a solution having the following composition is prepared:

|   | G. |
|---|---|
| Copolymer described in Example 3 | 4 |
| Isopropyl palmitate | 0.2 |
| 2-amino-2-methyl-1-propanol | 0.45 |
| Perfume | 0.2 |
| Absolute ethyl alcohol, q.s.p. | 100 |

30 grams of this solution is conditioned with 42 grams of "Freon 11" and 28 grams of "Freon 12."

By pulverization a lacquer giving particular brilliance to the hair is obtained.

Example F

A hair setting lotion is obtained according to the invention by forming a solution having the following composition:

Copolymer described in Example 1—1.8 g.
Triethanolamine (about pH 7)—0.184 g.
Trimethyl cetyl ammonium bromide—0.1 g.
Hydrosoluble silicon oil—0.3 g.
Alcohol, q.s.p.—60°
Water, q.s.p.—100 cc.

After shampooing and drying the hair, 20 cc. of this solution is applied and the locks of hair are rolled up so as to set the curls in the usual manner.

When this is done it is determined that the hair has sufficient stiffening, that its brilliance and combing out are remarkable and that the duration of this coiffure is superior to that obtained with conventional hair setting lotions.

Example G

A hair setting lotion having the following composition is prepared:

Copolymer according to Example 1—2.7 g.
2-amino-2-methyl-1,3-propane-diol—0.39 g.
Polyvinylpyrrolidone—0.5 g.
Urea—0.1 g.
Alcohol, q.s.p.—50°
Water, q.s.p.—100 cc.

When applied as explained in Example F, this solution allows obtaining excellent results, especially as to strength, brilliance and absence of stickiness of the hair.

Example H

A setting lotion is prepared according to the invention which has the same properties as the lotion described in Example G of the following composition:

Copolymer described in Example 3—4 g.
Monoethanolamine (about 7.6 pH)—0.20 g.
Alcohol, q.s.p.—45°
Water, q.s.p.—100 cc.

After application it is determined that the hair is lively, shiny and not sticky.

Example I

A setting is done in the conventional manner with a solution having the following composition:

Copolymer according to Example 2—1 g.
Triisopropanolamine—0.175 g.
Alcohol, q.s.p.—65°
Water, q.s.p.—100 cc.

An immediate strengthening of the hair is noted, a fine shine and an excellent holding of the set.

Example J

Excellent sets are obtained, particularly as concerns immediate strengthening and brilliance by utilizing a setting solution of the following composition:

Copolymer according to Example 3—1.2 g.
2-amino 2-methyl-1,3-propane-diol—0.234 g.
Isopropyl alcohol, q.s.p.—70°
Water, q.s.p.—100 cc.

What is claimed is:

1. A cosmetic composition comprising a solution in a solvent selected from the group consisting of ethyl alcohol, isopropyl alcohol and an aqueous mixture of said alcohols of a film forming amount of a salt of an amine base and a copolymer, said copolymer being selected from the group consisting of: copolymers constituted by 63–88% units by weight of vinyl acetate, 5 to 15% units by weight of crotonic acid and 5 to 25% units by weight of one polymerizable ester selected from the group consisting of: vinylic esters of the formula $$R-COOCH=CH_2$$

in which R is selected from the group consisting of hydrocarbons in linear or branched chain comprising from 10 to 22 carbon atoms, allylic esters and methallylic esters of the formula:

$$R'-COOCH_2-\underset{R''}{C}=CH_2$$

in which R' is selected from the group consisting of hydrocarbons in saturated linear or branched chain comprising 10 to 22 carbon atoms, and R'' is selected from the group consisting of hydrogen and —$CH_3$.

2. The cosmetic composition according to claim 1 wherein the degree of neutralization of said salt corresponds to 10–150% of stoichiometric neutralization.

3. The cosmetic composition of claim 2 wherein said amine base is selected from the group consisting of monoethanolamine, diethanolamine, triethanolamine, the isopropanolamines, morpholine, 2-amino-2-methyl-1-propanol and 2-amino-2-methyl 1,3-propanediol.

4. The cosmetic composition of claim 1 wherein said ester is selected from the group consisting of vinyl laurate, vinyl palmitate, vinyl stearate, vinyl isostearate, vinyl behenate, allyl laurate, allyl stearate, allyl isostearate, allyl behenate, methallyl laurate, methallyl stearate, methallyl isostearate and methallyl behenate.

5. The cosmetic composition of claim 1 wherein said solution contains 1 to 4% by weight of said salt.

6. The composition of claim 1 wherein said solvent is an aqueous mixture of said alcohol present in amounts of 20 to 70% by weight of said mixture and said composition contains 1 to 3% by weight of said salt.

7. A pressurized sprayable aerosol composition comprising a solution of a film forming amount of a salt of an amine base and a copolymer in a mixture of ¼ to ⅓ by weight of a solvent selected from the group consisting of ethanol and isopropanol and ⅔ to ¾ by weight of an aerosol propellant selected from the group consisting of trichlorofluoromethane, dichlorodifluoromethane and their mixtures, said copolymer being selected from the group consisting of
  copolymers constituted by 63 to 88% units by weight of vinyl acetate, 5 to 15% units by weight of crotonic acid and 5 to 25% by weight of one polymerizable ester selected from the group consisting of
vinylic esters having the formula $R-COOCH=CH_2$, wherein R is selected from the group consisting of linear or branch chained hydrocarbons containing 10–22 carbon atoms,
allylic esters and methallylic esters having the formula $$R'-COOCH_2-\underset{R''}{C}=CH_2$$

wherein R' is selected from the group consisting of saturated linear or branch chained hydrocarbons containing 10–22 carbon atoms and R'' is selected from the group consisting of hydrogen and —$CH_3$, said salt being present in amounts of 1–4% by weight of said composition.

References Cited
UNITED STATES PATENTS 2,996,471   8/1961   Reiter et al. _____ 424—47

ALBERT T. MEYERS, Primary Examiner

V. C. CLARKE, Assistant Examiner

U.S. Cl. X.R.

260—33.4, 33.8, 80.8; 424—70, 71